R. L. WILLIAMS.
METHOD OF EMULSIFYING LIQUID.
APPLICATION FILED MAR. 16, 1914.

1,200,560.

Patented Oct. 10, 1916.

Witnesses:
E. C. Murphy
L. B. Weymouth

Inventor:
Robert L. Williams
By Henry J. Miller
Atty.

UNITED STATES PATENT OFFICE.

ROBERT L. WILLIAMS, OF BRIGHTON, MASSACHUSETTS, ASSIGNOR TO JOHN W. DAVIES, OF READING, MASSACHUSETTS.

METHOD OF EMULSIFYING LIQUID.

1,200,560.  Specification of Letters Patent.  Patented Oct. 10, 1916.

Application filed March 16, 1914. Serial No. 824,883.

*To all whom it may concern:*

Be it known that I, ROBERT L. WILLIAMS, a citizen of the United States, residing at Brighton, in the county of Suffolk and State of Massachusetts, have invented a new and useful Method of Emulsifying Liquid, of which the following is a specification, reference being had to the accompanying drawings, forming part thereof.

This invention relates to an improved method of treating a liquid containing fat globules whereby the liquid is clarified and emulsified and the defects of previous methods of emulsification are eliminated.

The main object of the invention is to produce milk and other liquid containing fat globules substantially free from grit and other foreign matter, and with the fat globules so comminuted that they will not rise to the surface of the liquid.

Other objects of the invention will appear from the following description.

The invention consists in the method of treating liquid having fat globules to obtain a clean emulsified product as will hereinafter be more fully described and pointed out in the claims.

Figure 1:
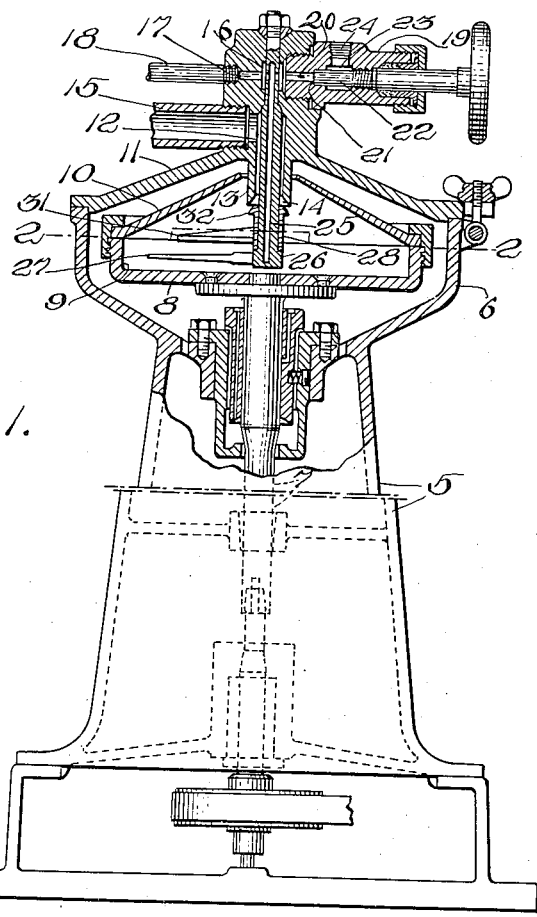
Figure 2:
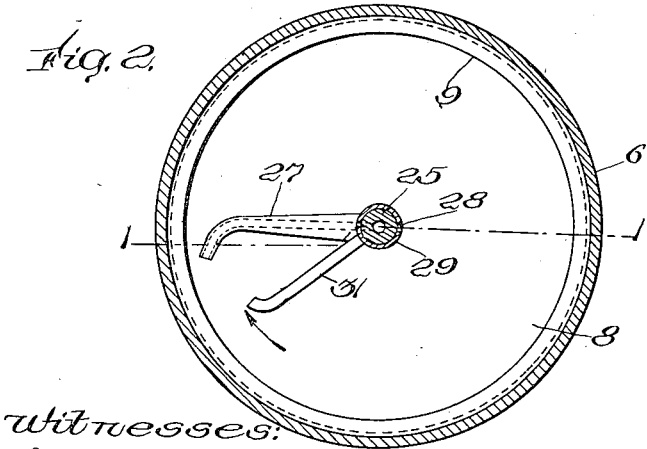
Figure 3:
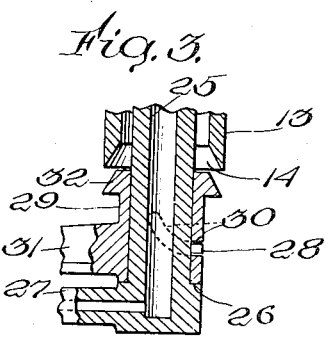

Figure 1, represents a view in elevation of a machine for carrying out this improved method, parts of the machine being broken away and other parts being shown in section as taken on line 1—1, Fig. 2. Fig. 2, represents a cross sectional view of parts of the same as taken on line 2—2, Fig. 1. Fig. 3, represents a sectional view, taken on said line 1—1, Fig. 2, showing a section of the delivery and outlet pipes.

Similar characters of reference designate corresponding parts throughout.

Milk and other liquids containing fat globules have heretofore been subjected to an emulsifying process by supplying the liquid to a compression pump communicating by a pipe with emulsifying devices provided with a very narrow passage through or between these devices. In such machines in spite of the use of filters much of the grit and impurities in the liquid were received with the milk by the pump chambers and were carried to the emulsifying devices. Two disadvantages resulted. The surfaces of the emulsifying devices were scarred by the grit passing over them and these surfaces although of hard material had to be reground and smoothed from time to time. Some of the grit and other impurities caught in the narrow passage which became clogged by their accumulation so that the operator was obliged frequently to readjust the emulsifying devices. This readjustment involved separating the emulsifying surfaces whereby the dirt was washed into the product of the machine, and resetting the surfaces together.

By my invention I efficiently clean the milk or other liquid, avoid the difficulties above mentioned, produce a clean emulsified product and am able to employ simple forms of emulsifying devices which effectively disrupt the fat globules at comparatively low pressure. I am also able to dispense with pumps and make use of a comparatively inexpensive rotary machine.

In carrying this invention into practice I employ a machine having a rotary bowl driven at high speed preferably about six thousand (6000) feet per minute. I make use of both the centrifugal force and the velocity imparted to the liquid by the high speed of rotation. By the centrifugal force the liquid is carried forcibly against the peripheral or confining wall of said bowl and those impurities carried by the liquid having a higher specific gravity than it will be thrown outward through the liquid to said confining wall to which they will adhere in a pasty mass, which is scraped off after the machine is stopped and the covers taken off the bowl. The cleansed liquid is carried by its velocity into and through the outlet pipe which is obstructed by the emulsifying devices; thereby much of the velocity is converted into pressure against those devices. The pressure of the liquid in passing through the narrow passages of the emulsifying devices is reconverted into velocity and at the same time the fat globules are disrupted.

The centrifugal ejection of the grit and other foreign particles is facilitated by the presence in the bowl of comparatively a small quantity of the liquid at one time. I therefore provide a valve in the inlet pipe to the bowl automatically controlling the supply of liquid to said bowl and actuated to close when the rotating liquid in the bowl exceeds a predetermined amount.

The machine preferably used in carrying out this improved method comprises the pedestal or frame 5 having the head 6 and bearings in which is journaled the vertical shaft 7 adapted to be rotated and having at its upper end the bowl 8 having the peripheral wall 9 which sustains the removable cover member 10. Mounted on the head 6 of frame 5 is the sustaining member 11 having the passage 12, extending downward to deliver into the bowl 8 by the pipe 13 having at its lower end the valve seat 14. Liquid is supplied to said passage 12 through pipe 15.

The upper portion of passage 12 is contracted somewhat and then enlarged to furnish the chamber 16 having the bore 17 leading to the gage pipe 18. Secured in the wall of said chamber 16 is the plug fitting 19 having the bore 20 in communication at one end with said chamber 16 and terminating at the other end in the valve seat 21 against which the emulsifier plug 22 is adjustably seated. This plug 22 is embraced by the chamber 23 of said fitting 19 which chamber 23 receives the liquid passing between the plug 22 and its seat. The liquid escapes through the outlet 24 of said chamber 23.

Within the passage 12 is mounted the tubular stem 25 having at its lower end within bowl 8 the shoulder 26 and the tubular arm 27 which extends from said stem 25 to a point adjacent the wall 9 of bowl 8 and has an open mouth adapted to receive the liquid rotating in said bowl and convey it to the bore of said stem 25, and thence to chamber 16. Stem 25 has the pin 28, Fig. 3, and rotatably mounted on said stem 25 between its shoulder 26 and the lower end of pipe 13 is the sleeve 29 having the cam slot 30, engaged with pin 28, the lever arm 31, and the valve 32 which latter coöperates with valve seat 14 of pipe 13.

It will be apparent from the above description that if the bowl 8 is rotated at a high speed preferably about four thousand six hundred (4600) revolutions per minute, the liquid supplied thereto will be rotated at a proportionately high speed per minute and the centrifugal force developed will cause those particles of foreign matter heavier than the milk to be thrown through the milk against the wall 9 to which they will adhere in a sticky mass.

The velocity of the rotating liquid will impel it into the open mouth of arm 27, through said arm and the tubular stem 25, thence through chamber 16 and bore 20 to the plug 22. The plug obstructs the free flow of the liquid whereby considerable pressure is obtained, the amount of pressure depending on the velocity of the rotating liquid. I have obtained from 400 to 600 lbs. per square inch pressure when the bowl is rotated at about four thousand six hundred (4600) to four thousand eight hundred (4800) revolutions per minute. The pressure in the liquid is again converted into velocity as it passes through the narrow passage between the plug 22 and its seat and, at the same time, the fat globules are disrupted and so comminuted that they will not rise to the surface of the liquid. If the supply of liquid accumulates in the bowl 8 until the mass of rotating liquid held against wall 9 by centrifugal force strikes and moves the controller arm 31, it will cause the rotation of sleeve 29 relative to pin 28 whereby said sleeve partially or wholly closes against seat 14 of the pipe 13 and thus controls the inflow of liquid. From time to time the members 10 and 11 of the machine should be detached and the accumulation of milk or liquid and foreign matter adhering to the wall 9 removed and the bowl 8 thoroughly cleansed.

Having thus described my invention I claim as new and desire to secure by Letters Patent:

1. The method of treating a fatty liquid containing impurities which consists in rapidly rotating a substantially constant volume of said liquid in a suitable container, retaining said impurities on the inner wall of said container, conducting said liquid out of said container by the inertia of the liquid in rotation, developing pressure in said liquid by obstructing its flow, and breaking the fat globules contained in said liquid by passing it in a thin film at high velocity between closely adjacent surfaces.

2. The method of treating a fatty liquid containing impurities which consists in rapidly rotating a body of said liquid in a container, retaining impurities of said liquid, forming a column of said liquid of less area than said body and having a velocity attained by such rotation, supplying liquid to said body to maintain a constant volume in said column, developing pressure in the liquid of said column by obstructing its flow, and utilizing said pressure to break the fat globules contained in said liquid.

ROBERT L. WILLIAMS.

Witnesses:
 HENRY J. MILLER,
 ESTHER C. MURPHY.